(12) United States Patent
Kuroiwa

(10) Patent No.: US 8,760,112 B2
(45) Date of Patent: Jun. 24, 2014

(54) BATTERY MANAGEMENT APPARATUS

(75) Inventor: Yasushi Kuroiwa, Kariya (JP)

(73) Assignee: DENSO CORPORATION, Kariya (JP)

( * ) Notice: Subject to any disclaimer, the term of this patent is extended or adjusted under 35 U.S.C. 154(b) by 140 days.

(21) Appl. No.: 13/193,185

(22) Filed: Jul. 28, 2011

(65) Prior Publication Data

US 2012/0049787 A1 Mar. 1, 2012

(30) Foreign Application Priority Data

Aug. 27, 2010 (JP) ................................ 2010-191023

(51) Int. Cl.
*H02J 7/00* (2006.01)
*H02J 7/14* (2006.01)

(52) U.S. Cl.
USPC ........................... 320/106; 320/104; 320/109

(58) Field of Classification Search
USPC ........................................ 320/106, 109, 104
See application file for complete search history.

(56) References Cited

U.S. PATENT DOCUMENTS

| 5,525,890 | A | * | 6/1996 | Iwatsu et al. .................. 320/106 |
| 5,572,110 | A | * | 11/1996 | Dunstan ........................ 320/106 |
| 5,608,306 | A | * | 3/1997 | Rybeck et al. ................ 320/106 |
| 7,352,152 | B2 | * | 4/2008 | Kawaguchi et al. .......... 320/106 |
| 7,683,571 | B2 | * | 3/2010 | Takamatsu et al. ........... 320/106 |
| 7,728,548 | B2 | * | 6/2010 | Daynes et al. ................ 320/106 |
| 8,290,649 | B2 | * | 10/2012 | Iwashita et al. ................ 701/22 |
| 2005/0134223 | A1 | | 6/2005 | Shigeeda |
| 2007/0214296 | A1 | * | 9/2007 | Takamatsu et al. ............. 710/63 |
| 2008/0297116 | A1 | | 12/2008 | Odaohhara et al. |
| 2009/0251300 | A1 | * | 10/2009 | Yasuda et al. ............... 340/426.1 |
| 2009/0256717 | A1 | * | 10/2009 | Iwai .............................. 340/825 |
| 2009/0295326 | A1 | * | 12/2009 | Daynes et al. ................ 320/106 |
| 2010/0010698 | A1 | * | 1/2010 | Iwashita et al. ................. 701/22 |
| 2010/0079108 | A1 | | 4/2010 | Monden et al. |
| 2010/0235026 | A1 | | 9/2010 | Shimizu et al. |
| 2012/0139476 | A1 | * | 6/2012 | Evans et al. .................... 320/106 |

FOREIGN PATENT DOCUMENTS

| EP | 0 985 596 A2 | 3/2000 |
| JP | A-H8-138749 | 5/1996 |
| JP | 2006-094608 A | 4/2006 |
| JP | A-2008-042985 | 2/2008 |
| JP | A-2008-312391 | 12/2008 |
| JP | A-2005-065429 | 3/2010 |

OTHER PUBLICATIONS

U.S. Appl. No. 13/193,290, filed Jul. 28, 2011, Fujiwara.
U.S. Appl. No. 13/192,689, filed Jul. 28, 2011, Shinoda.
U.S. Appl. No. 13/192,649, filed Jul. 28, 2011, Kurimoto.
U.S. Appl. No. 13/192,603, filed Jul. 28, 2011, Tanaka.

(Continued)

*Primary Examiner* — M'Baye Diao
(74) *Attorney, Agent, or Firm* — Posz Law Group, PLC

(57) ABSTRACT

A vehicle carries a battery package as its power source. Plural battery modules in the battery package respectively have a memory device for memorizing identification information that proves authenticity of each of the battery modules. A battery control unit in the vehicle has an authentication unit. The authentication unit determines whether or not each of the battery modules is a genuine product. When the battery module is determined as a non-genuine product, a control unit performs a restricted charging. The restricted charging restricts a charge amount of the battery, for effectively improving usability of the battery and for restricting use of a non-compliant battery.

14 Claims, 8 Drawing Sheets

(56) References Cited

OTHER PUBLICATIONS

Office action dated Sep. 5, 2013 in the corresponding CN application No. 201110252873.8 (English translation).

Office Action mailed Nov. 19, 2013 in the corresponding JP application No. 2010-191023 (English translation).

Office Action mailed Feb. 12, 2014 issued in corresponding JP patent application No. 2010-191023 (and English translation).

* cited by examiner

BATTERY MANAGEMENT APPARATUS

CROSS REFERENCE TO RELATED APPLICATION

The present application is based on and claims the benefit of priority of Japanese Patent Application No. 2010-191023, filed on Aug. 27, 2010, the disclosure of which is incorporated herein by reference.

FIELD OF THE INVENTION

The present disclosure generally relates to a battery management apparatus used in a battery-driven device which operates on an electric power of a battery.

BACKGROUND INFORMATION

Conventionally, a battery-driven device that operates on an electric power of a battery, and where the use of the battery is restricted if the battery is non-compliant battery, is disclosed. For example in Japanese Patent 2008-42985 a non-compliant battery is prohibited from charging when a "use period" of the battery expires.

According to this disclosure, the battery-driven device can restrict use of the expired battery, that is, a non-compliant battery. In the conventional device, charging of the non-compliant battery is prohibited. However, the user is prevented from using the battery-driven device due to the above configuration. Therefore, the user's convenience is considerably deteriorated. For example, the user cannot drive a vehicle if the vehicle is battery-driven.

SUMMARY OF THE INVENTION

In view of the above and other problems, the present application provides a battery management apparatus, which improves the user convenience while preventing use of the non-compliant battery, when the battery is not compliant to a required specification.

The present application uses following techniques for achieving the above-described purposes.

In an aspect of the present invention, a battery management apparatus includes: a battery checker that determines if a battery is compliant or non-compliant; a regular charger that charges the battery when the battery checker determines that the battery is compliant; and an irregular charger that charges the battery under a restricted charge control relative to a charge control for the regular charger when the battery checker determines that the battery is non-compliant. In the above configuration, the battery checked as non-compliant can be charged. Therefore, a battery driven device using the non-compliant battery can be put in a usable condition. Further, the non-compliant battery can be charged under a restricted charge control. Therefore, the user convenience is improved while restricting the use/convenience of the non-compliant battery.

Further, the irregular charger of the above-described battery management apparatus charges the battery to a restricted charge amount that is less than a charge amount by the regular charger. In this manner, the restricted charge amount is suitably determined in advance.

Further, the restricted charge amount is set based on a value recorded in the battery. In this manner, a suitable charge amount is set as the restricted charge amount of the non-compliant battery.

Further, the restricted charge amount is set based on a charge rate of the battery. In this manner, the restricted charge amount reflects the battery condition.

Further, the irregular charger sets the restricted charge control according to a battery condition checked as non-compliant by the battery checker. In this manner, a condition of the non-compliant battery is reflected to restricted charging of the non-compliant battery.

Further, the restricted charge control includes at least one of a charge amount condition of the battery and a number condition of charge times. In this manner, the charging of the non-compliant battery is restricted by at least one of the amount of the charged electricity and the number of charge times.

Further, the irregular charger charges the battery at a restricted charge speed that is slower than a charge speed of the regular charger. In this manner, the user suffers from a certain amount of inconvenience by the restricted charge speed of the battery. In other words, use of the non-compliant battery is somewhat restricted. Further, the user can still the non-compliant battery. In other words, the user convenience is improved during a period of using the non-compliant battery.

Further, the irregular charger charges the battery for a limited charge time after having the non-compliant check result by the battery checker. In this manner, by limiting the number of charge times, the use of the non-compliant battery is restricted in terms of user convenience regarding the number of charge times.

Further, by including a display unit for displaying that the battery is charged by the irregular charger, and the restricted charging due to the use of the non-compliant battery is notified for the user from the battery management apparatus.

BRIEF DESCRIPTION OF THE DRAWINGS

Objects, features, and advantages of the present disclosure will become more apparent from the following detailed description made with reference to the accompanying drawings, in which.

DETAILED DESCRIPTION

Figure 1:
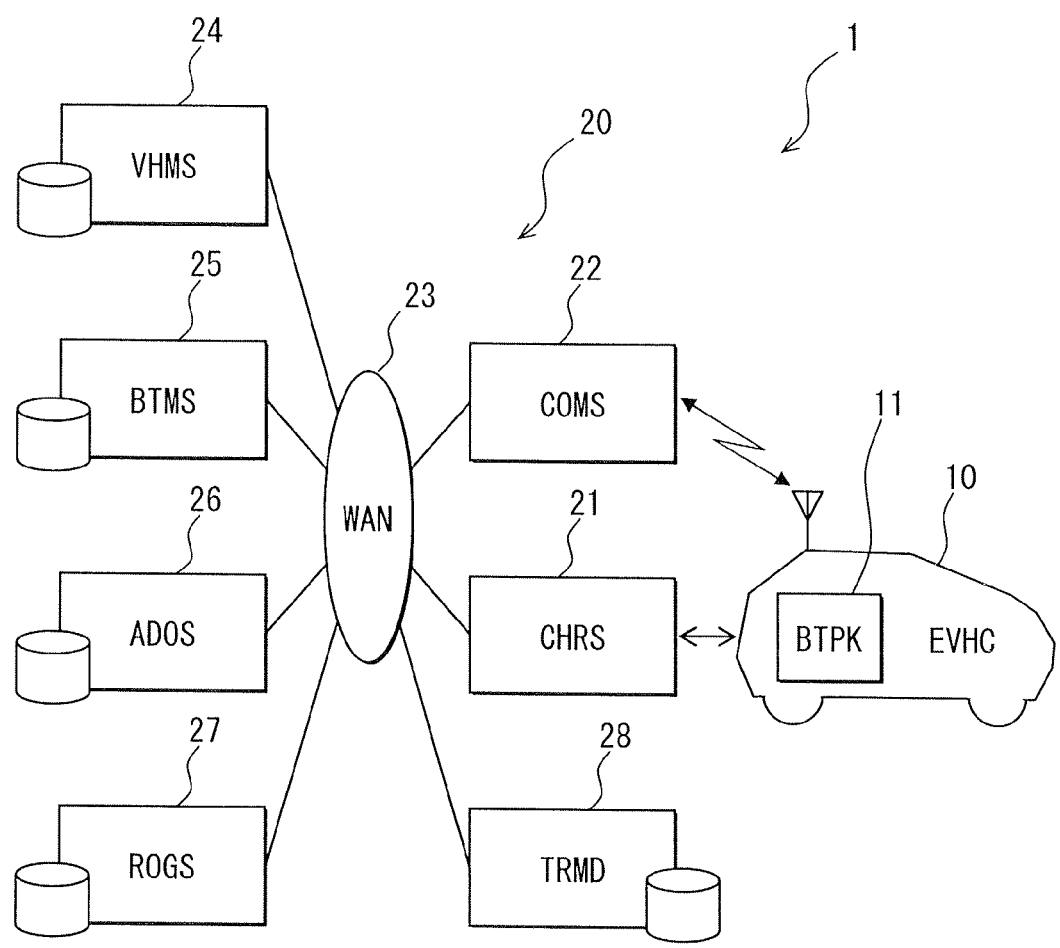
FIG. 1 is a block diagram of a battery management apparatus in a first embodiment of the present application.

In the following, embodiments of the present application are described with reference to the drawing. Like parts have like numbers in those embodiments, and redundant portions may be omitted from some of those embodiments for brevity. When only a part of the configuration is explained in an embodiment, the rest of the configuration is supplemented by the configuration of preceding embodiments. Combinations of embodiments should not be limited unless expressly restricted or there is hindrance to prohibit the combination.

First Embodiment

With reference now to FIG. 1 a battery management apparatus 1 comprises a vehicle (EVHC) 10 and a ground facility 20 disposed on the ground. The vehicle 10 is a battery-driven device operated by a battery 11. The vehicle 10 generates at least a part of its driving power by using a motor. For example, the vehicle 10 may be a battery car driven only by a motor, or a hybrid car in which an internal combustion engine is used together with the motor.

The ground facility 20 includes a charge station (CHRS) 21 and a communication facility (COMS) 22. The charge station 21 includes a charger for charging the battery 11 in the vehicle 10 and a data communications equipment to connect to a wide area network (WAN) 23. The communication facility 22 is a communications equipment of a communication company, and is wirelessly communicable with communication equipment in the vehicle 10. For example, the communication facility 22 is a ground station of a mobile telephone service company. The communication facility 22 includes a data communications equipment to connect to WAN 23. WAN 23 serves as a communication line. For example, WAN 23 is provided through Internet.

The ground facility 20 also includes a server of vehicle manufacturers (VHMS) 24, a server of battery manufacturers (BTMS) 25, a server of administrative organization (ADOS) 26, and a server of related organizations (ROGS) 27, which may be referred to as servers 24, 25, 26, 27. Servers 24, 25, 26, 27 are connected to WAN 23. The components of the ground facility 20, that is, charge station 21, the communication facility 22, the server 24, 25, 26, 27, that is, charge station 21, the communication facility 22, the server 24, 25, 26, 27, are in mutual communication through WAN 23.

The ground facility 20 may be equipped with an input terminal 28. For example the input terminal 28 may be a personal computer connectable to WAN 23, a portable terminal, or a cellular phone. The input terminal 28 is connectable to the server 24, 25, 26, 27 in the ground facility 20. That is, for example, through communication to the server ADOS 26, the input terminal 28 sets, modifies, or initializes information regarding authentication of the battery 11, together with other processes. The input terminal 28 may be provided as a navigation apparatus including a display unit 15 on the vehicle 10.

The server 24, 25, 26, 27 each include a recording device for recording information provided from WAN 23. The contents of the recording device can be used by the individual servers, and can also be read by a third party. The server VHMS 24 can be read by a manufacturer of the vehicle 10. The manufacturer of the vehicle 10 is an organization related to a battery-driven device, and may be designated as a responsible organization which is responsible for the vehicle 10. The server BTMS 25 can be read by a manufacturer of the battery 11. The manufacturer of the battery 11 is an organization related to the battery, and may be designated as a responsible organization that is responsible for the battery 11.

The responsible organization(s) may be responsible for product liability, a service provision obligation for providing a service that is designated in a contract paper, a social responsibility for preventing an accident and providing relief, together with other responsibilities. For example, the vehicle manufacturer of the vehicle 10 and the battery manufacturer of the battery 11 are considered to bear a few responsibilities regarding their products and its use.

The server VHMS 24 of the vehicle manufacturer has a recording device for recording information provided from WAN 23. The contents of the recording device can be used in the server VHMS 24, and can be read by a manufacturer of the vehicle 10. The server BTMS 25 of the battery manufacturer has a recording device for recording information provided from WAN 23. The contents of the recording device can be used in the server BTMS 25, and can be read by a manufacturer of the battery 11.

The server ADOS 26 can be read by an administrative organization. The administrative organization is an organization related to a battery-driven device or a battery. The administrative organization may be a public organization for substantially administering the responsible organization that is responsible for the vehicle 10 or the battery 11. The public organization includes an organization belonging to a national government or a local government, such as, a governmental organization controlling road traffic, a governmental organization controlling a consumer safety, or the like. The public organization may include a "substantially" public organization, such as, a product authentication organization for authenticating a product such as a battery that has passed a quality test, a performance test or the like. Such an organization may include a non-governmental organization related to a traffic safety or a consumer safety, a non-profit organization, or a corporation. For example, the public organization includes an organization providing security for the vehicle 10 or the battery 11, an insurance company for providing insurance for the vehicle 10 or the battery 11, and an organization for organizing a vehicle user membership. The public organization may further include a non-profit organization that promotes a vehicle safety through public advertisement. These public organizations directly or indirectly control and substantially administer the responsible organizations. That is, the governmental organization controls and administers the vehicle manufacturers and the battery manufacturers based on applicable laws and regulations. Further, the companies and corporations as well as non-profit organizations may also control and administer, through advertisement and information communication to the public, the vehicle manufacturers and the battery manufacturers.

Figure 2:
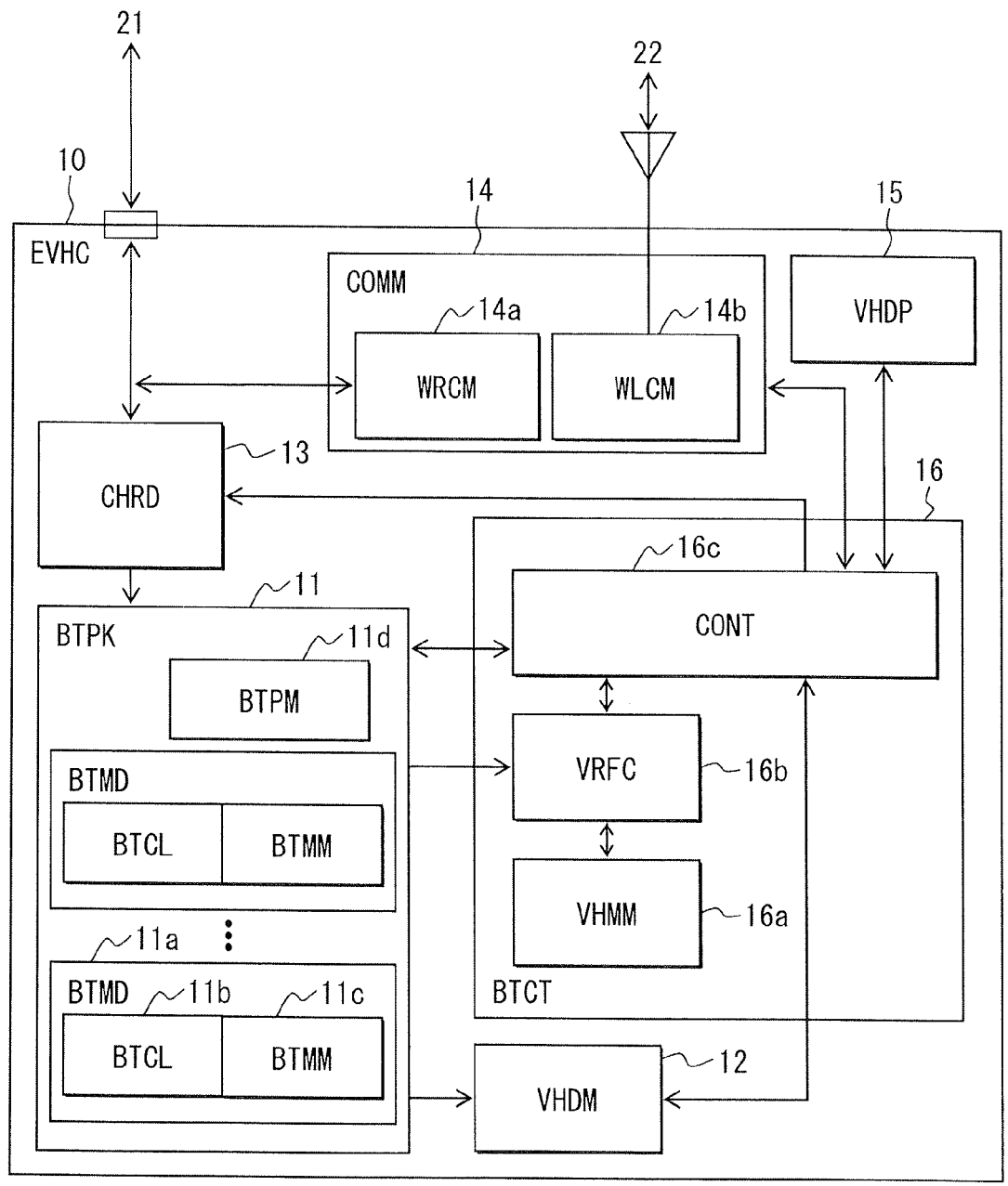
FIG. 2 is a block diagram of a vehicle part of the battery management apparatus in the first embodiment.

The server ROGS 27 may be read by a related organization, which is an organization related to the vehicle 10 and the battery 11. For example, the related organization may include a police department, an organization related to credit information of the user of the vehicle 10 that provide authentication for personal information of the user, an insurance company providing insurance for the vehicle 10 or the battery 11 may be included in the related organization, or the like FIG. 2 is a block diagram of a vehicle part disposed in the vehicle 10 of the battery management apparatus 1. In the battery management apparatus 1, the battery 11 is installed in the vehicle 10. The battery 11 may be referred to as battery package (BTPK) 11. The battery package 11 has a plurality of battery modules (BTMD) 11a installed thereon. Each of the battery modules 11a is replaceable. The battery module 11a includes a battery cell (BTCL) 11b and a memory device (BTMM) 11c. The battery cell 11b is a basic component of the battery 11. The battery cell 11b may be a lithium ion battery. The memory device 11c is a part of the battery 11, which cannot be removed from the battery module 11a without breaking it. The memory device 11c memorizes authentication information to authenticate the battery module 11a. The authentication information may include identification information (ID) of the battery module 11a and management information. The identification information may include a code showing that the battery module 11a is a genuine battery and a code showing that the battery module 11a is distributed to an authorized distribution channel. The management information is for managing a use of the battery module 11a compliant to a specification. That is, the management information specifies a warranty period, a maximum number of use, a charge condition, a discharge condition, and the like of the battery module 11a. The memory device 11c memorizes security information related to the battery 11.

Further, the battery package 11 includes a storage device (BTPM) 11d. The storage device 11d memorizes management information about the whole battery package 11. The management information specifies a warranty period, a charge condition, a discharge condition, and the like of the whole battery package 11. Further, the charge condition of the whole battery package 11 specifies, as a condition of restricted charging, a restricted charge amount and a restricted number of charging.

In the vehicle 10, a genuine battery specified by a vehicle maker or a non-genuine battery that is compatible with the genuine battery may be used as the battery 11 or the battery module 11a. For example, the "genuine" battery may indicate a battery that is specified by a maker of the vehicle 10, or a seller of the vehicle 10. Further, the "genuine" battery may indicate a battery that is specified by both the maker of the vehicle 10 and the maker of the battery 11 as a suitable battery for use in the vehicle 10. Furthermore, the "genuine" battery may indicate a battery that is specified by an organization of the makers of the vehicle 10 and/or the makers of the battery 11. The "genuine" battery may include a near-genuine battery that is specified by a public organization, or a near-genuine battery that is specified by an organization of makers and/or sellers. In other words, a battery is proven to be "genuine" not by a label on the battery but by a battery authentication performed by a computer in the vehicle 10.

The non-genuine battery means batteries without warranty, or without authentication by a reliable organization. Those batteries may be designated as a non-compliant battery. The non-genuine batteries may or may not have recorded information on a responsibility of the product (e.g., a product liability), which can be readable by a computer, for identifying a person, a company, or an organization in charge of the battery. Those non-genuine batteries cannot be authenticated by a computer in the vehicle 10. The non-genuine battery may be called as a third party product, or a copy product.

The battery 11 is not considered as "properly-functioning" when the warranty period is expired, or when the maximum times of use is surpassed. That is, even when the battery 11 is a genuine one, the warranty-expired battery or the surpassed max-use-time battery is not considered as "properly-functioning", and may also be referred to as an "improper battery". The improper battery are batteries that are not in proper use condition, or are in a no-guarantee condition for use, which may also include a battery that may be broken. The properly-functioning battery can be authenticated by a computer in the vehicle 10. The properly-functioning battery may also be referred to as a proper battery or the like. An improper battery may also be referred to as not properly-functioning battery or the like.

Further, a legally-acquired battery and an illegally-acquired battery are included in a category of the genuine battery. The legally-acquired battery is acquired via an authorized distribution channel, and installed in the vehicle 10 by an authorized procedure. The illegally-acquired battery is a battery acquired illegally from an un-authorized channel or the like. For example, stolen products are categorized as an illegally-acquired battery. The legally-acquired battery can be authenticated by a computer in the vehicle 10.

A "compliant" battery means that a battery is (a) a genuine one, (b) a properly-functioning one, and (c) a legally-acquired one. A non-compliant battery means that a battery is either (d) a non-genuine one, (e) a not properly-functioning one, or (f) an illegally-acquired one. In other words, when a battery is expressed as "compliant" or "normal", the battery is a genuine one, a properly-functioning one, and a legally-acquired one. When a battery is expressed as "non-compliant" or "abnormal", the battery is either a non-genuine one, not properly-functioning one, or an illegally-acquired one.

The vehicle 10 has a drive mechanism (VHDM) 12 installed therein. The drive mechanism 12 drives the vehicle 10 on electricity supplied from the battery 11. The drive mechanism 12 includes an electric motor. Further, the drive mechanism 12 may include an internal combustion engine generating a driving power of the vehicle 10.

The vehicle 10 has a charge device (CHRD) 13 installed therein. The charge device 13 controls charging of the battery 11. When the vehicle 10 is connected to the charge station 21 by a charge line, the charge device 13 controls the charging of the battery 11 by the charge station 21. The charge device 13 may have a breaker for permitting and prohibiting the charging of the battery 11 according to an input signal from outside of the charge device 13. The charge device 13 may have a charge amount control unit for controlling the amount the battery 11 is charged. According to the input signal, the charge amount of the battery 11 is controlled to a certain amount between a minimum charge amount and a maximum charge amount according to the input signal.

The vehicle 10 has a communication device (COMM) 14 installed therein. The communication device 14 is in communication with at least one server through a wired connection or a wireless connection. The communication device 14 includes a wired communication device (WRCM) 14a communicating with the charge station 21 through a charge line. Further, the communication device 14 includes a wireless communication device (WLCM) 14b communicating wirelessly with the communication facility 22 through a cellular phone network. The communication device 14 transmits data to an outside server, (i.e., a memory device outside of the communication device 14), through one of the wired communication device 14a or the wireless communication device 14b. The communication device 14 is in communication with at least one of the server VHMS 24 of the vehicle manufacturer and the server ADOS 26 of the administrative organization.

The vehicle 10 has a display unit (VHDP) 15 installed thereon. The display unit 15 displays a message for the user, such as a driver of the vehicle 10. In addition, the user of the vehicle may mean an owner of the vehicle, a manager of the vehicle, a driver of the vehicle, or a passenger of the vehicle. The display unit 15 may be provided as a meter unit, a navigation unit, or an imaging device on the vehicle 10.

The vehicle 10 has a battery control unit (BTCT) 16 installed thereon. The battery control unit 16 is provided as a microcomputer equipped with a computer-readable storage medium. The storage medium stores a computer-readable program. The storage medium may be provided as a memory. The program may be executed by a control unit for controlling the battery control unit 16 to be serving as a device described in this specification. The battery control unit 16 further includes a memory unit (VHMM) 16a, an authentication unit (VRFC) 16b and a control unit (CONT) 16c. These components 16a, 16b, 16c may be provided as a microcomputer circuit and a program executed therein.

The battery control unit 16 controls the battery 11, the drive mechanism 12 and the charge device 13 so that the battery 11 is used properly. The battery control unit 16 is configured to perform the above-described control according to a condition of the battery 11. The battery control unit 16 further performs an authentication control to restrain the use of a non-compliant battery, while preventing inconvenience of to user. The battery control unit 16 has a battery checker for checking whether a battery is compliant to a maker-specified requirement. Further, the battery control unit 16 controls the charge device and/or the drive mechanism according to a check result of the battery checker and a transmission unit for sending out relevant information through a communication channel according to the check result of the battery checker. The above-described function units of the battery control unit 16 may be called as function blocks or modules.

A battery management apparatus 1 includes, as a main component, the battery control unit 16 that may be installed in the vehicle 10. A part of the battery management apparatus 1, such as the battery checker of the battery control unit 16, can be included in the ground facility 20. Further, information indicative of the use of a non-compliant battery may be configured to be relayed by a plurality of servers, to be stored in an intended recording device. In such a configuration, a part of the transmission unit is installed in the ground facility 20.

The memory unit 16a of the battery control unit 16 memorizes authentication information to authenticate the battery 11. The authentication information, which may also be referred to as the maker-specified requirement, may include a code to authenticate a genuine battery, a code to authenticate a properly-functioning battery, and a code to authenticate a legally-acquired battery.

An authentication unit 16b of the battery control unit 16 serves as the battery checker for checking whether the battery is compliant or non-compliant based on whether the battery is genuine, properly-functioning, and legal. The authentication unit 16b includes a reader unit for reading the identification information and the management information from the battery 11 as well as a retrieval unit for retrieving the authentication information memorized in the memory unit 16a. The authentication unit 16b determines whether each of the battery modules 11a is compliant or non-compliant.

The authentication unit 16b includes means to determine whether a battery is a genuine or non-genuine battery based on the authentication information and the identification information. The authentication unit 16b determines whether a battery is genuine for each of the battery modules 11a. The determination of whether a battery is a genuine or non-genuine can be determined using various techniques. For example, predetermined identification information is issued only for a genuine battery. The manufacturer of the battery 11 stores the issued information to the memory device 11c. The authentication information is registered in the memory unit 16a. When the identification information accords or is the same as the authentication information, the authentication unit 16b authenticates the battery 11 as a genuine one. When the identification information is not the same as the authentication information, the authentication unit 16b authenticates the battery 11 as a non-genuine one. When the battery module 11a is disposed in the vehicle 10, a code, which should be the same as the identification information, may be registered in the memory unit 16a as the authentication information. By employing a particular procedure or a particular device for reading the identification information from the memory device 11c or for registration of the authentication information in the memory unit 16a, unauthorized registration is prevented.

In another technique, the genuine battery may have the identification information issued with a predetermined encrypting code. The manufacturer of the battery 11 stores the issued identification information to the memory device 11c. The memory unit 16a has a code registered therein as the authentication information for decrypting the identification information. The authentication unit 16b decrypts the identification information by using the registered authentication information, and the decrypted information authenticates the battery as a genuine one when the decrypted information is an expected one. Furthermore, in yet another scheme, predetermined identification information is issued only for a genuine battery. The authentication unit 16b accesses the server ROGS 27 of the related organization through the communication device 14, and determines whether the identification information is of a genuine battery. In this case, the battery checker is realized as a combination of the authentication unit 16b and the server ROGS 27. The authentication scheme of the genuine battery based on the identification information may be implemented by employing various authentication techniques.

Based on the management information the authentication unit 16b includes a means for determining whether a battery is properly functioning or not properly-functioning. The authentication unit 16b determines whether a battery is properly-functioning for each of the battery modules 11a. The determination whether or not a battery is properly-functioning can be carried out by the following process. The memory device 11c memorizes warranty information indicative of a warranty period of the battery 11 the management information. The authentication unit 16b determines whether the warranty period has expired. If the warranty period has not expired, the battery 11 is determined as properly-functioning or proper. If the warranty period has expired, the battery 11 is determined as not properly-functioning or improper and is non-compliant. In another process, the memory device 11c memorizes information indicative of a maximum number of charge operations as the management information. The authentication unit 16b determines whether the maximum number of charge operations is surpassed. If the maximum number of charge operations is not surpassed, the battery 11 is determined as properly-functioning. If the maximum number of charge operations is surpassed, the battery 11 is determined as not properly-functioning or improper and as is non-compliant.

Based on the authentication information and the identification information, the authentication unit 16b includes means to determine whether a battery is a legally-acquired or an illegally-acquired battery, and does so for each of the battery modules 11a. The determination whether or not a battery is a legally-acquired battery can be carried out by the following process. A predetermined identification information is issued only for a genuine battery supplied to an authorized distribution channel. The manufacturer of the battery 11 stores the issued identification information to the memory device 11c. When the battery module 11a acquired via the authorized distribution channel is installed in the vehicle 10, predetermined and authorized registration processing is carried out. By the registration processing, the authentication information same as the identification information is registered to the memory unit 16a. When the identification information accords with authentication information, the authentication unit 16b authenticates the battery module 11a as a legally-acquired product. When it does not, the battery module 11a is an illegally-acquired product and is non-compliant. The authentication process of the legally-acquired battery based on the identification information may be implemented by employing various authentication techniques.

Based on the authentication result by the authentication unit 16b, the control unit 16c controls the battery 11, the charge device 13, and the drive mechanism 12. The control unit 16c may provide means to allow or prohibit charging according to the authentication result, means to limit an electricity charge amount according to the authentication result, and means to restrict travel of the vehicle by using the battery 11 according to the authentication result. When a non-compliant battery is used, the control unit 16c and the communication device 14 serve as a transmission unit for sending out, to the external servers VHMS 24, ADOS 26 through WAN 23, information indicative of the use of the non-compliant battery 11.

Figure 3:
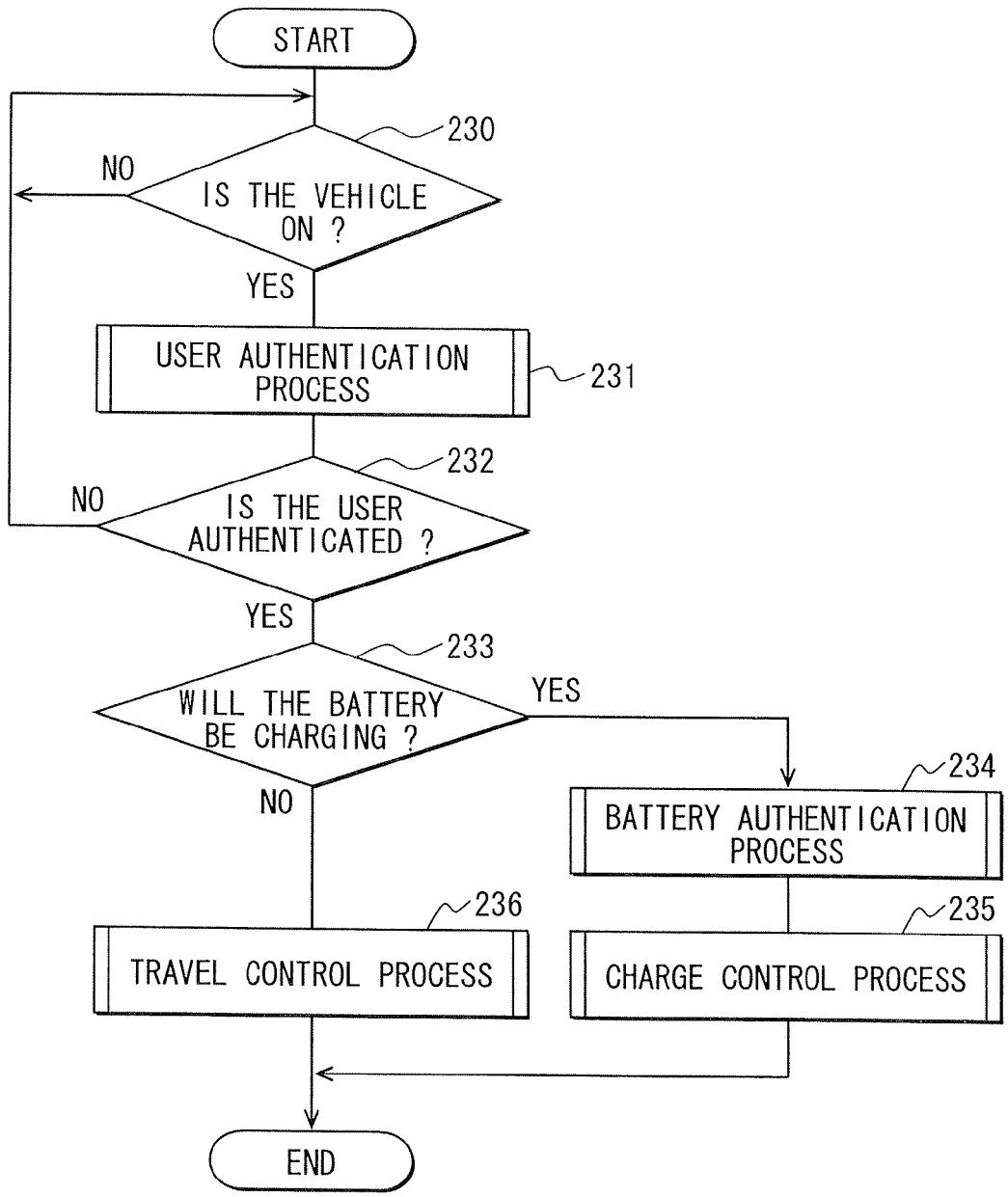
FIG. 3 is a flowchart of control of the battery management apparatus in the first embodiment.

The operation of the battery management apparatus of the first embodiment is explained with reference to FIGS. 3, 4, 5, 6. FIG. 3 is a flowchart showing an operation of the battery management apparatus 1 of the vehicle 10. In step 230 it is first determined whether the vehicle 10 has been started. In other words, when an occupant gets in the vehicle 10, it is determined whether or not a power switch of the vehicle 10 is operated to an "ON" position. When it is determined that the use of the vehicle 10 has not started, the process returns to step 230. When it is determined that the use of the vehicle has started, the process proceeds to step 231. In step 231, a user authentication process is carried out to determine whether the person who is going to use the vehicle 10 has the proper authority. For example, it is determined whether a key or an electronic code used by the user has authenticity. In step 232, it is determined whether use of the vehicle 10 is approved by the user authentication of step 231. When use of the vehicle 10 is prohibited, the process returns to step 230. When use of the vehicle 10 is permitted the process proceeds to step 233.

The user authenticity process in steps 230 to 232 is carried out by a security device belonging to the vehicle 10 or an immobilizer belonging to the drive mechanism 12. Note that the user authentication process in step 231 is different from the battery authentication process in later step 233. Security of the battery information is improved by carrying out the battery authentication process after an affirmative determination in the user authentication.

In step 233, it is determined whether the user is going to charge the battery 11. When the user stops the vehicle 10 in front of the charge station 21 and connects a charge line to the vehicle 10, the process proceeds to step 234. In step 234, the battery authentication process is carried out. The battery authentication process is carried out by the authentication unit 16b and the control unit 16c. In step 235, a charge process to charge the battery 11 is carried out. The charge process is carried out by a control unit in the charge device 13. Further, in the charge process, an authentication result in the battery authentication process is referred to, and the charge process is carried out based on the authentication result of the battery 11.

In step 233, if it is determined that the user is not charging the battery 11, the process proceeds to step 236. In step 236, a travel control process to use the battery 11 as a power source is carried out. The travel control process is carried out by a control unit in the drive mechanism 12. Further, before the travel control process, the battery authentication process may be carried out. The travel control process refers to the authentication result from the battery authentication process, and the travel control process is carried out based on the authentication result of the battery 11.

Figure 4:
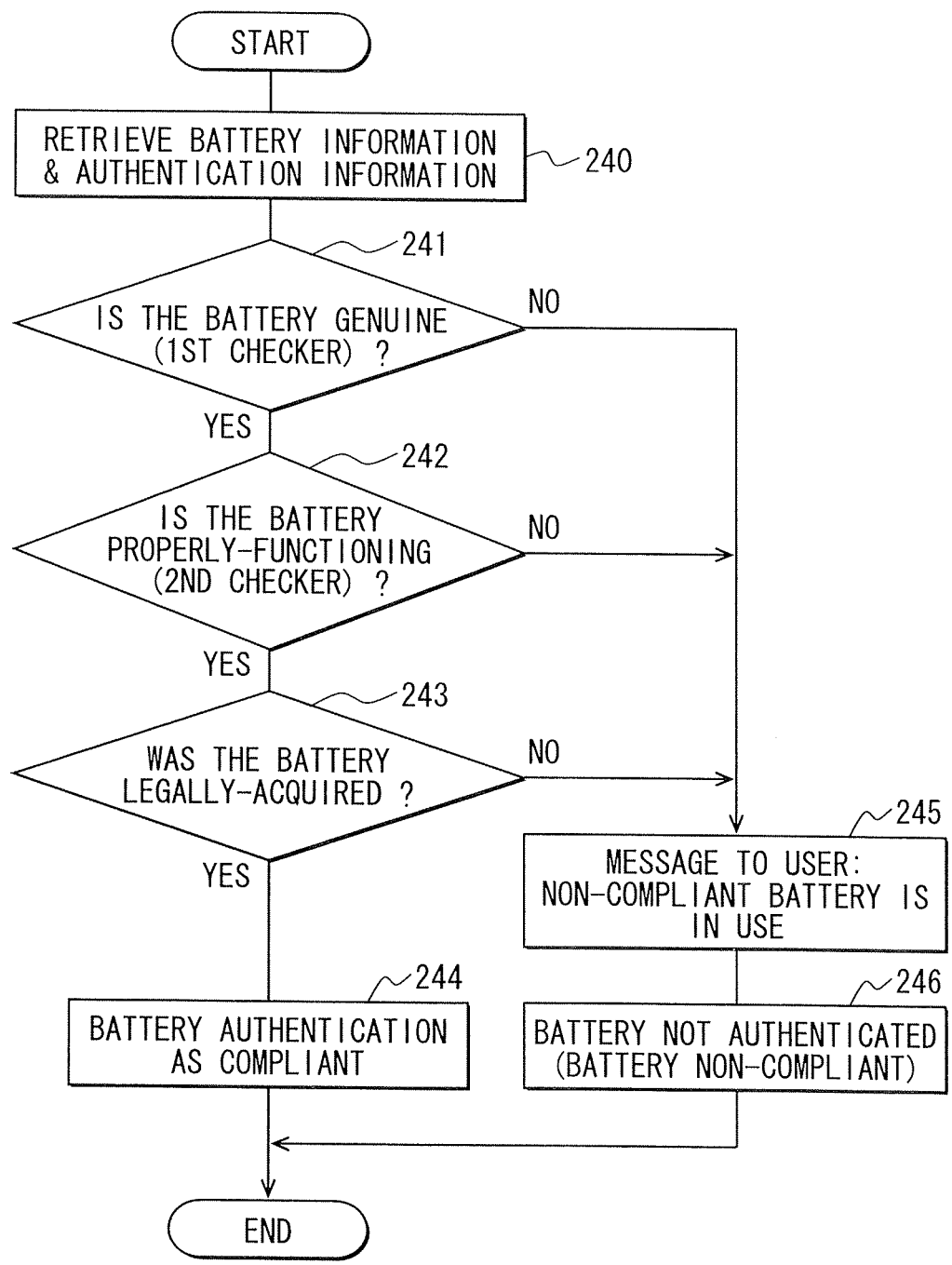
FIG. 4 is a flowchart of control of the battery management apparatus in the first embodiment.

FIG. 4 is a flowchart of the battery authentication process. Steps 240-246 serve as the battery checker for determining whether the battery 11 is a compliant or non compliant battery. In other words, the battery checker check the compliance of the battery. In step 240, the identification information and battery information including management information are retrieved from the battery 11. Further, in step 240, the authentication information memorized in the memory unit 16a is retrieved.

In step 241, it is determined whether the battery 11 is a genuine product suitable for the vehicle 10 based on the identification information and the authentication information. For example, this determination can be carried out based on whether a code showing a genuine product is included in the identification information. Step 241 serves as "a first checker" to determine whether a battery is a genuine battery. Step 241 is carried out for each of the battery modules 11a. The process proceeds to step 245 if any one of the battery modules 11a is found to be non-genuine. The process proceeds to step 242 if all the battery modules 11a are genuine.

In step 242, it is determined, based on the management information retrieved from the battery 11, whether the battery 11 is properly-functioning. Step 242 serves as "a second checker" to determine whether a battery is properly-functioning. Step 242 is carried out for each of the battery modules 11a. The process proceeds to step 245 when any one of the battery modules 11a is found to be not functionally-proper. The process proceeds to step 243 if all the battery modules 11a are genuine.

In step 243, it is determined whether the battery 11 is a legally-acquired battery. In other words, it is determined if the battery 11 is acquired via the authorized distribution channel, and it is determined whether the battery 11 is installed in the vehicle 10 by an authorized procedure. For example, this determination can be carried out by determining whether the identification information is associated with the information that is unique to the vehicle 10. Step 243 is carried out for each of the battery modules 11a. The process proceeds to step 245 when any one of the battery modules 11a is found to be illegally-acquired.

If the process determines in step 243 that all the battery modules 11a are legally-acquired, the battery 11 is determined as a compliant or a normal battery because it was determined as genuine in step 241, as properly-functioning in step 242, and as legally-acquired in step 243. Thus, in step 244, it is recorded that the battery 11 is authenticated as compliant. In other words, when the step 244 is carried out, the battery is a normal one. Because the battery is determined as normal, a normal charge control for the battery 11 and a normal travel control for the vehicle 10 are permitted thereafter.

When the battery 11 is determined as non-genuine in step 241, or as not properly-functioning in step 242, or as illegally-acquired in step 243, the battery 11 is considered to be a non-complaint or abnormal battery. Therefore, in steps 245 and 246, a countermeasure process is performed.

In step 245, the user of the vehicle 10 is notified of the use of the non-compliant battery 11 by displaying a message to the user on the display unit 15. In step 246, non-authentication of the battery 11 is memorized. That is, the fact that the battery 11 is a non-compliant battery is memorized in step 246. In other words, when step 246 is performed, the battery is non-compliant Thus, a countermeasure control configured to restrain the use of the non-compliant battery 11 is performed. The countermeasure control is, for example, provided as a restricted charge control for charging the battery 11, where the restricted charge control is different from the normal charge control.

Figure 5:
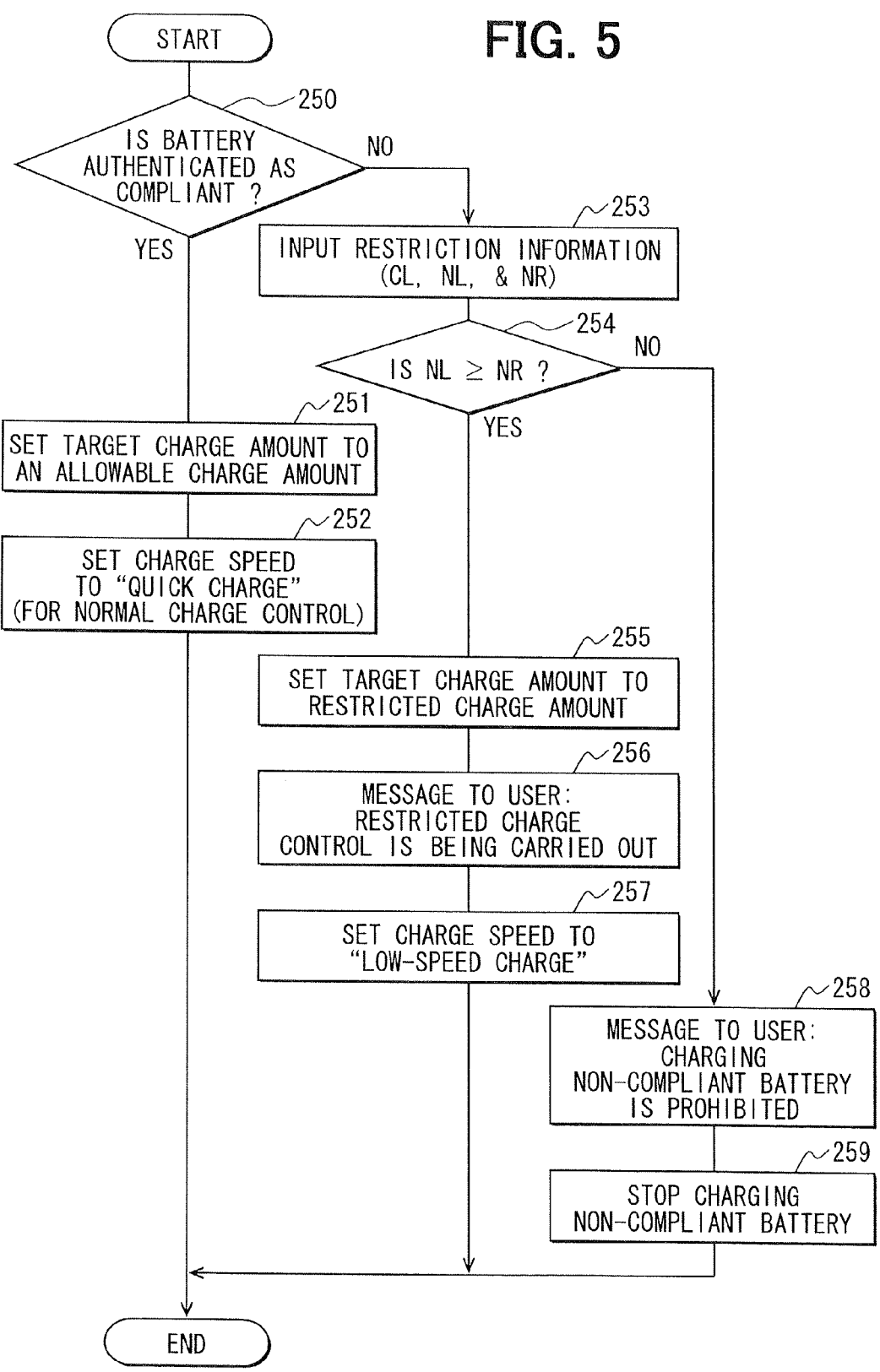
FIG. 5 is a flowchart of control of the battery management apparatus in the first embodiment.

FIG. 5 is a flowchart of a charge control process. In step 250, it is determined whether the battery 11 is authenticated. In the determination in step 250, the authentication result in step 244 or step 246 is referred to. When the battery 11 has been authenticated as a compliant battery, steps 251 and 252 are performed for a normal charge control, and a regular charger for charging the battery under a normal charge control is provided.

In step 251, a target charge amount is set. In step 251, the target charge amount is set to an allowable charge amount (CP), which is the maximum amount of charging of the battery 11. The target charge amount is set according to charging indices of the battery 11, or according to charge-related indices of the battery 11. For example, a battery capacity Ah may be used as one of the charging indices. In such a case, an allowable maximum capacity BvehMax of the battery 11 may be set as the target charge amount. The battery capacity is unique to the battery 11, or to the battery modules 11a. The allowable charge amount (CP) is storable in the battery control unit 16. The allowable charge amount (CP) may also be stored in the memory device 11c of the battery module 11a, or in the memory device 11d of the battery 11.

In step 252, the battery 11 is quick-charged to the target charge amount by the charge device 13. If the charge is interrupted by the user, the battery 11 is not charge to the target charge amount. However, the battery 11 is charged quickly by the quick charge. The "quick charge" is a charge speed that is greater than the charge speed of the restricted charge control described later. Therefore, the speed of the quick charge may not necessarily be limited to the maximum charge speed. In the normal charge control including steps 251 and 252, the user is capable of charging the battery 11 to an allowable maximum charge amount. In other words, when the compliant battery is used, the user can charge the battery 11 in an unlimited manner within an allowable range.

In step 250, if the battery 11 is not authenticated as compliant, in other words is a non-compliant battery, then the restricted charge control is carried out in steps 253-257. Under the restricted charge control, an irregular charger to charge the battery 11 is usually provided.

The restricted charge control is different from the normal charge control. The restricted charge control provides inconvenient charge for the user in comparison to the normal charge control. For example, a restricted charge amount in the restricted charge control is set to be smaller than a normal charge amount in the normal charge control. In such a case, the irregular charger charges a battery to the restricted charge amount that is smaller than the amount charged by the regular charger. The restricted charge control is not configured to restrict the amount of charge to zero. In the restricted charge control, the battery 11 can still be charged. However, the restricted charge amount is smaller than the allowable charge amount (CP) for the battery 11, or the charge amount that is acceptable/permissible to the battery 11. Further, the restricted charge amount is set to allow the user to drive the vehicle 10 for a certain distance. In such a case, the user can still drive the vehicle 10 for a limited distance by charging the battery 11 to the restricted charge amount. In addition, the user is prompted to switch to a compliant battery.

The restricted charge control may be configured to require more time to charge the battery 11 than the normal charge control. Such restriction on the charge speed may be imposed by itself, or may be imposed in combination with other restrictions of the restricted charge control. More practically, the quick charge is prohibited and only a slow-speed charge is permitted. In such a case, the irregular charger charges the battery 11 at a restricted charge speed that is slower than a charge speed by the regular charger. Therefore, the user can still drive the vehicle 10 by charging the battery 11, with certain inconvenience imposed on the user. In addition, the user is prompted to switch to a compliant battery.

Further, the number of times the battery 11 can be charged can be restricted in the restricted charge control, and is referred to as a restricted number of charge times. The restricted number of charge times is substantially smaller than the number of charge times that the battery 11 can endure by specification. For example, the restricted number of charge times may be set to several times, such as 2, 5, 10 or so, but not zero. In such a case, the irregular charger permits the charge under the restricted charge condition for only a predetermined number of times. Therefore, by restricting the number of charge times, the use of the non-compliant battery by the user can be restrained, with certain inconvenience imposed on the user.

In step 253, the control unit 16c inputs restriction information required for the restricted charge control. For example, the control unit 16c retrieves the management information of the battery 11 from the memory device 11d. In the memory device 11d, the management information of the battery 11 is memorized. The restricted charge amount (CL) and the restricted number of charge times (NL) are included in the management information. When the management information of the battery 11 cannot be retrieved from the memory device 11d, a stored default value is used by the memory unit 16a. The restricted charge amount (CL) is set in advance, in consideration of a characteristic of the vehicle 10 and the performance of the battery 11 which is installable in the vehicle 10, and it is memorized in the memory device 11d of the battery 11.

The restricted charge amount (CL) may be configured to allow the vehicle 10 to travel only for a predetermined distance or only for a predetermined time. The above-described predetermined distance or time may be set to prevent the user to suffer an intolerable disadvantage. For example, the restricted charge amount (CL) may be set to allow the user to drive the vehicle 10 to a service factory after it is determined that the battery 11 is a non-compliant battery. The restricted charge amount (CL) can be set to be less than 50% and more than 10% of the capacity of the battery 11. For example, the restricted charge amount (CL) may be set to a smallest capacity BvehMin in advance.

The control unit 16c inputs an allowable number of charge times (NR), which is the number of times the battery 11 had been charged after the battery 11 is determined as non-compliant as long as the non-compliance persists. The allowable number of charge times (NR) may be memorized as one of the management information in the memory device 11d.

In step 254, it is determined whether the allowable number of charge times (NR) is equal to or smaller than the restricted number of charge times (NL). If the allowable number of charge time is equal to or smaller than the restricted charge number of charge time (NR), then the non-compliance battery 11 can be recharged under the restricted charge control. If the allowable number of charge time is not equal to or smaller than the restricted charge number of charge time (NR), then the non-compliance battery 11 cannot be charged. In other words, whether the allowable number of charge times (NR) after the determination of non-compliance still remains is determined. When the allowable number (NR) still remains, the process proceeds to step 255.

In step 255, the target charge amount is set. In step 255, the restricted charge amount CL is set to the target charge amount. Because the restricted charge amount CL is set in advance based on the capacity of the battery 11, the restricted charge amount CL set in the above-described manner is appropriate for preventing a trouble, even when the non-compliant battery is used.

In step 256, the user of the vehicle 10 is notified of the restricted charge control due to the use of the non-compliant battery. That is, a warning message indicating that the restricted charge control is carried out and is displayed on the display unit 15. Furthermore, contents of the restricted charge control may be displayed on the display unit 15. For example, the restricted charge amount (CL) and/or expected travelable distance are displayed. Furthermore, in step 256, a difference between the restricted number of charge times (NL) and the allowable number of charge times (NR) may also be displayed on the display unit 15. The difference between the restricted number of charge times NL and the allowable number of charge times NR is the remaining number of times the non-compliant battery 11 can be charged. Step 256 serves as a display unit for displaying that the charge of the battery 11 is performed by the irregular charger.

In step 257, the speed at which the charge device 13 charges the battery 11 to the target charge amount is set to a low speed charge. The charge speed of the low-speed charge is slower than the charge speed of the quick charge under the normal charge control. Therefore, the charge speed of the low-speed charge is not limited to the lowest charge speed. The user can charge the battery 11 to the restricted charge amount (CL) of the battery 11 in steps 253 to 257. In other words, the user can charge the battery 11 under a predetermined restricted charge condition when a non-compliant battery is used.

Furthermore, a charge prohibition control is carried out in step 258 and step 259 when the restricted charge control is carried out for the predetermined number of times. Steps 258 and 259 serve as a charge prohibition unit. When it is determined that the allowable number of charge times (NR) exceeds the restricted number of charge times (NL) in step 254, the process proceeds to step 258. In step 258, the user of the vehicle 10 is notified that the charging of the battery 11 is now prohibited. That is, step 258 displays a warning message on the display unit 15 that the charging of the battery 11 is prohibited. In step 259, the charging is actually prohibited. That is, in step 259, the charging of the battery 11 by the charge device 13 is stopped.

In the present embodiment, a battery can still be charged when a non-compliant battery is used. Therefore, the battery-driven device is still in a drivable/operable condition. In addition, by restricting the amount of charge or by restricting the charge speed, a certain amount of inconvenience is imposed on the user. Therefore, the convenience of the user is improved while restraining the use of the non-compliant battery.

Second Embodiment

Figure 6:
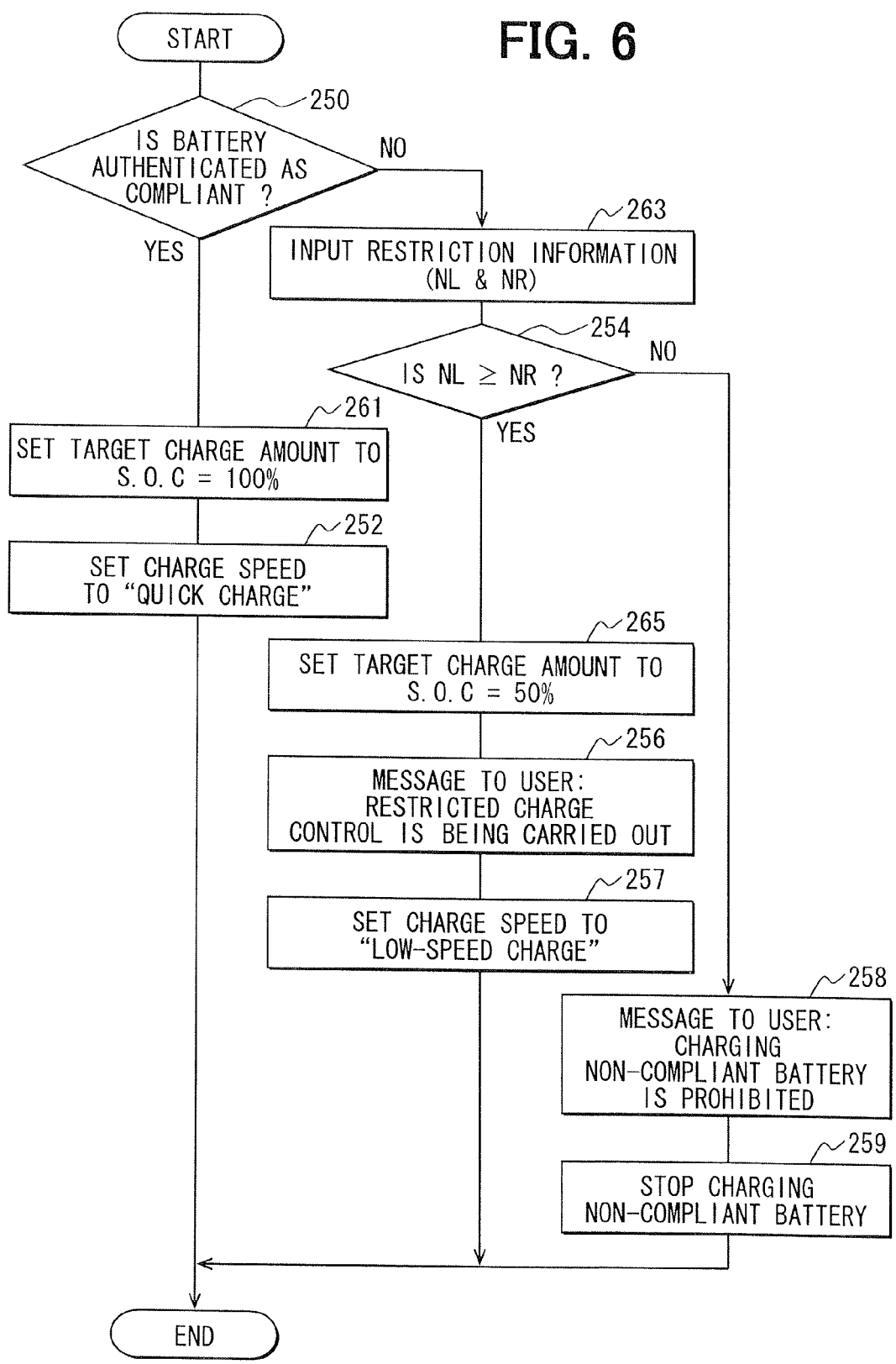
FIG. 6 is a flowchart of control of the battery management apparatus in a second embodiment of the present application.

In the second embodiment, a charge control process of the first embodiment shown in FIG. 5 is switched to a charge control process of a flowchart in FIG. 6. System configuration in the second embodiment is shown in FIGS. 1 to 4.

FIG. 6 is a flowchart of a charge control process of the second embodiment. Like numbers refer to like steps in FIG. 5. In the present embodiment, a charge rate is used as an index of the charge amount. The charge rate may also be called a state of charge SOC. In step 261, when the battery 11 is a compliant battery the target charge amount is set to SOC=100%, which is full charge. The charge rate can be measured based on the charge characteristics of the battery 11. The charge device 13 measures the charge rate, and controls the charging of the battery 11, so that it is charged to the charge rate of set the target charge amount.

In step 263, the restricted number of charge times NL and the allowable number of charge times NR are input. In step 265, SOC=50%, half charge, is set as the target charge amount.

The charge rate reflects the charge capacity of the battery 11 at the moment of charging. Therefore, in the present embodiment, the restricted charge amount is set according to the capacity of the battery 11.

Third Embodiment

Figure 7:
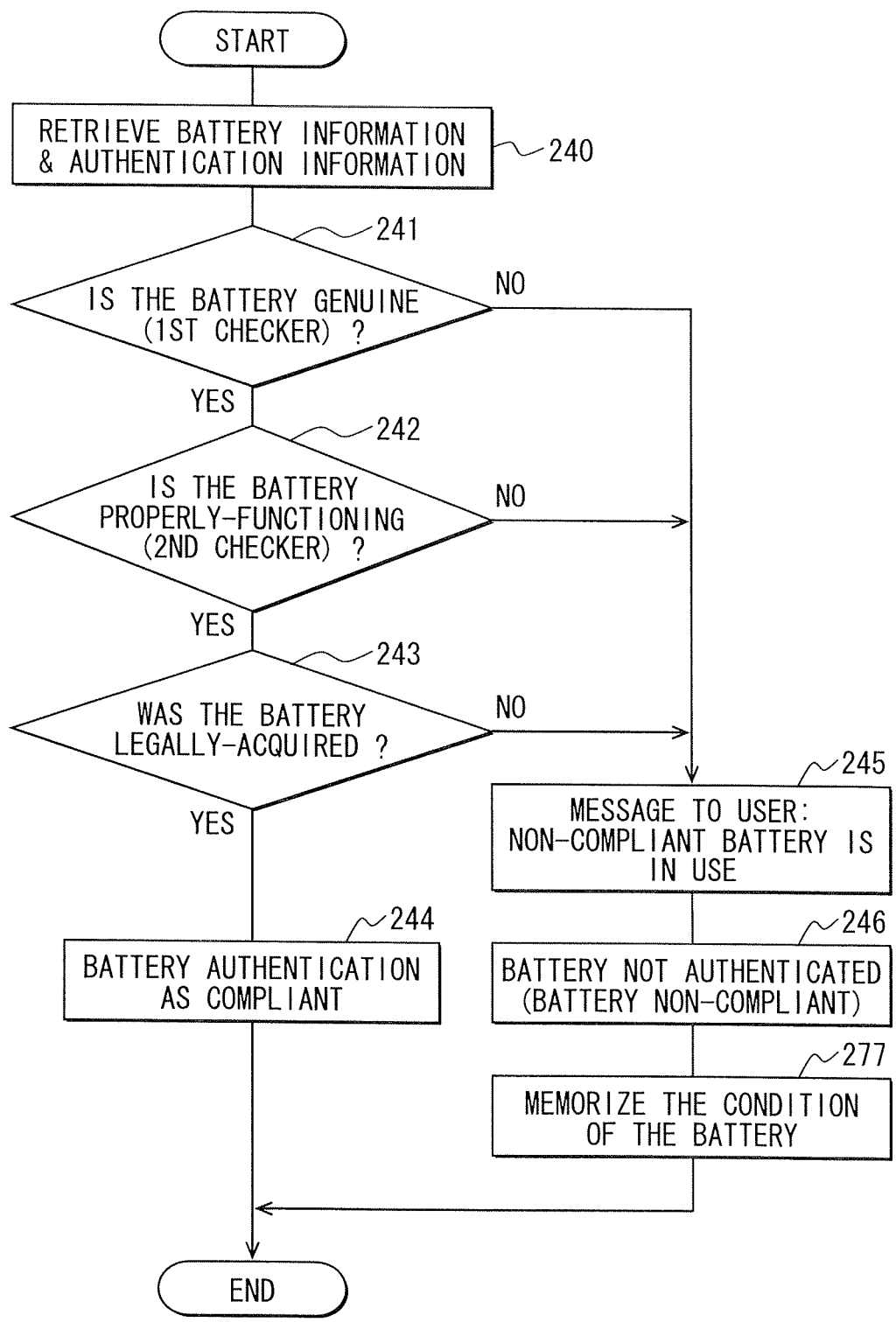
FIG. 7 is a flowchart of control of the battery management apparatus in a third embodiment of the present application.

In the third embodiment, an authentication process of the first embodiment shown in FIG. 4 is switched to a process of a flowchart in FIG. 7. Further, a charge control process of the first embodiment shown in FIG. 5 is switched to a charge control process of a flowchart in FIG. 8. System configuration in the third embodiment is shown in FIGS. 1 to 3.

FIG. 7 is a flowchart of an authentication process. Like numbers refer to like steps of FIG. 4. In step 277, a condition of the non-compliant battery is memorized. The condition of the non-compliant battery can be memorized as a level of difference from a normal battery. For example, when the battery 11 is not genuine, level 1 is memorized. When the battery 11 is genuine, but not properly-functioning, level 2 is memorized. Further, when the battery is genuine and properly-functioning, but illegally-acquired, level 3 is memorized. In this example, the higher the memorized level is, more "normal" the battery is. Step 277 serves as a memory unit for memorizing a negatively-determined condition of a battery determined by the battery checker as non-compliant.

Figure 8:
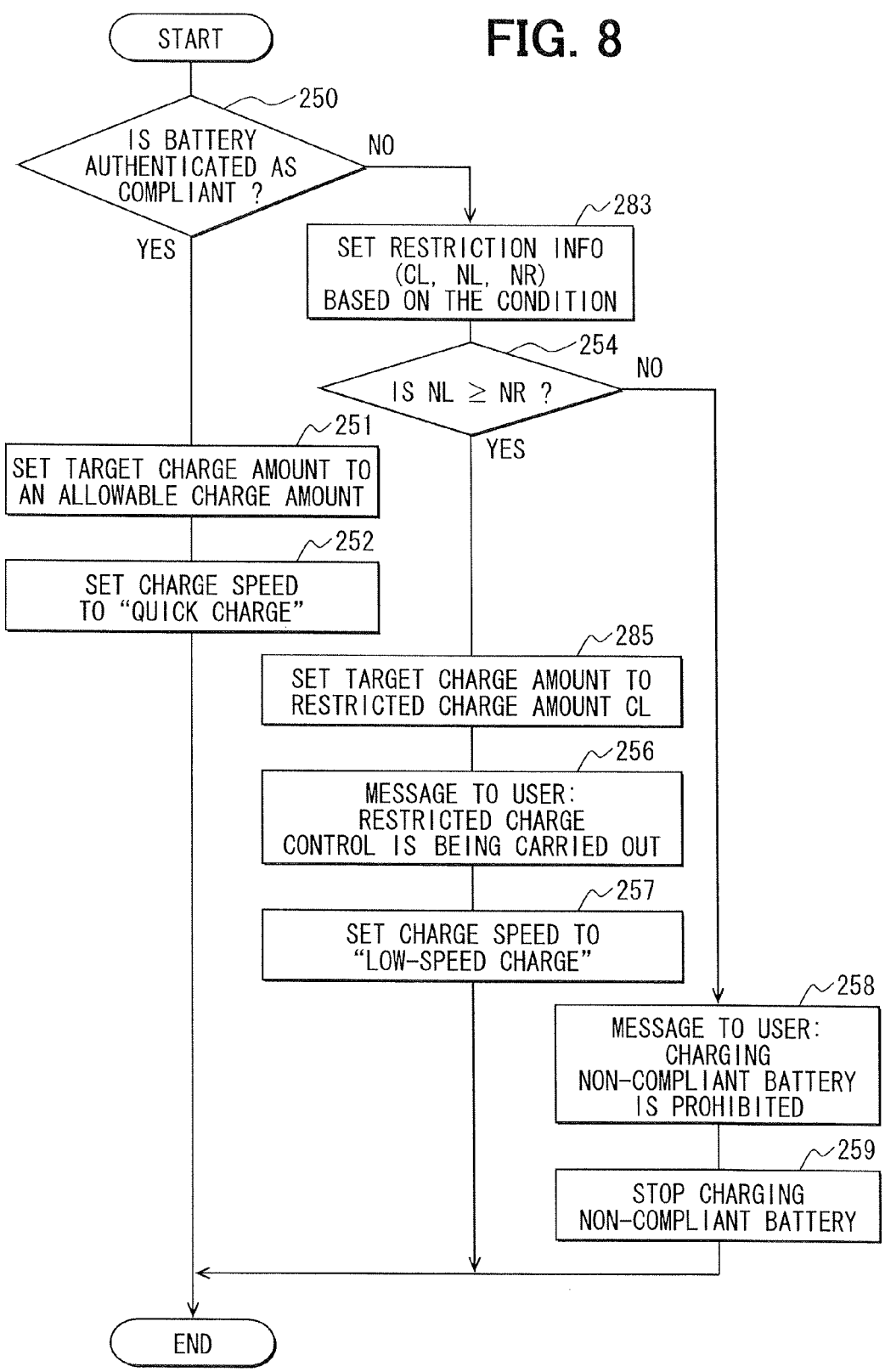
FIG. 8 is a flowchart of control of the battery management apparatus in the third embodiment.

FIG. 8 is a flowchart of a charge control process. Like numbers refer to like steps of FIG. 5. In step 283, the restricted charge amount (CL) and the restricted charge times (NL) is variably set according to the condition of the non-compliant battery memorized in step 277. In step 285, the restricted charge amount (CL) set in step 283 is set as the target charge amount.

For example, in the case of the level 1 condition, a predetermined smallest capacity BvehMin is set as the restricted charge amount (CL), and the restricted number of charge times (NL) is set to three. In the case of the level 2 condition, the restricted charge amount (CL) is set as a double amount of the smallest capacity BvehMin, and the restricted number of charge times (NL) is set to six. In the case of the level 3 condition, the restricted charge amount (CL) is set as a triple amount of the smallest capacity BvehMin, and the restricted number of charge times (NL) is set to ten. Further, the restricted number of charge times according to the memorized level may not be limited to the above. For example, the restricted number of charge times (NL) may set to be respectively different, vehicle to vehicle, and/or battery to battery.

Step 283 serves as a restricted charge condition setting unit for setting the restricted charge condition depending on the condition of the non-compliant battery. The charge condition can be restricted depending on the condition of non-compliance of the battery. For example, depending on the degree of normality of the non-compliant battery, the charge condition is restricted. In other words, a milder restriction is set to charging when the non-compliant battery is closer to a normal battery. Further, the charge condition can be restricted by the amount of charge and/or the number of charge times of the battery. For example, when the non-compliant battery is closer to a normal battery, a greater amount of charge is permitted in the present embodiment. In addition, a greater number of charge times is permitted, when the non-compliant battery is closer to a normal battery.

Other Embodiments

Although the present disclosure has been fully described in connection with preferred embodiment thereof with reference to the accompanying drawings, it is to be noted that various changes and modifications will become apparent to those skilled in the art.

For example, in the above embodiment, the amount of charge as a whole of the battery 11 is restricted when a non-compliant battery is used. Instead, the charge amount of a non-compliant battery module 11a may only be restricted. In such a configuration, it is desirable to memorize the restricted charge amount (CL) and the restricted number of charge times (NL) in a memory device 11c of the battery module 11a.

Further, for example, when a non-compliant battery is used, information regarding the use of the non-compliant battery may be reported to the server VHMS 24 of the vehicle manufacturer, the server BTMS 25 of the battery manufacturer and/or the server ADOS 26 of the administrative organization. Furthermore, when an illegally-acquired battery is used, reporting to investigation agencies such as a police may be made. Furthermore, the control unit may be implemented solely as software, solely as hardware, or a combination of them, for example. Furthermore, the control unit may be provided as an analogue circuit, for example.

Such changes, modifications, and summarized schemes are to be understood as being within the scope of the present disclosure as defined by appended claims.

What is claimed is:

1. A vehicle battery management apparatus comprising:
at least one processor, the at least one processor is configured to:
determine, in a battery checker, if a battery for a vehicle is compliant or non-compliant;
perform a normal charge control that controls a charge device to charge the battery, when the battery checker determines that the battery is compliant; and
perform a restricted charge control that controls the charge device to charge the battery, when the battery checker determines that the battery is non-compliant, wherein
the battery checker determines if a battery for a vehicle is compliant or non-compliant according to a battery condition, and
the restricted charge control includes a charge amount condition of the battery and a number of times the battery can be charged condition,
wherein, when the battery checker determines that the non-compliant battery is closer to a normal battery, a greater number of charge times is permitted than for the non-compliant battery that is determined to be more different from the normal battery.

2. The vehicle battery management apparatus of claim 1, wherein
the restricted charge control is configured to charge the battery to a restricted charge amount that is less than a charge amount by the normal charge control.

3. The vehicle battery management apparatus of claim 2, wherein
the restricted charge amount is set based on a value recorded in the battery.

4. The vehicle battery management apparatus of claim 2, wherein
the restricted charge amount is set based on a charge rate of the battery.

5. The vehicle battery management apparatus of claim 1, wherein
the restricted charge control is configured to charge the battery at a restricted charge speed that is slower than a charge speed of the normal charge control.

6. The vehicle battery management apparatus of claim 1, wherein
the restricted charge control is configured to charge the battery for a limited charge time after having the non-compliant check result by the battery checker.

7. The vehicle battery management apparatus of claim 1 further comprising a display unit for displaying that the battery is charged by the restricted charge control.

8. The vehicle battery management apparatus of claim 1, wherein
when the battery checker determines that the non-compliant battery is closer to a normal battery, a greater amount of charge is permitted than for the non-compliant battery that is determined to be more different from the normal battery.

9. The vehicle battery management apparatus of claim 1, wherein
the restricted charge amount is set to allow the vehicle to travel a predetermined distance or a predetermined time.

10. The vehicle battery management apparatus of claim 9, wherein the predetermined distance is a distance to a service facility.

11. The vehicle battery management apparatus of claim 1, wherein
the battery checker is further configured to determine closeness of the non-compliant battery is to the normal battery, as one of a plurality of predetermined levels of difference from the normal battery, and
the restricted charge control bases the number of times the battery can be charged condition on the closeness determined by the battery checker.

12. A vehicle battery management apparatus comprising:
at least one processor, the at least one processor is configured to:
determine, in a battery checker, if a battery for a vehicle is compliant or non-compliant;
perform a normal charge control that controls a charge device to charge the battery, when the battery checker determines that the battery is compliant; and
perform a restricted charge control that controls the charge device to charge the battery, when the battery checker determines that the battery is non-compliant, wherein the restricted charge control is configured to charge the battery to a restricted charge amount that is less than a charge amount by the normal charge control, wherein, the battery checker is further configured to determine closeness of the non-compliant battery is to the normal battery, as one of a plurality of predetermined levels of difference from the normal battery, and the restricted charge control bases the number of times the battery can be charged condition on the closeness determined by the battery checker.

13. The vehicle battery management apparatus of claim 12, wherein
the restricted charge amount is set to allow the vehicle to travel a predetermined distance or a predetermined time.

14. The vehicle battery management apparatus of claim 13, wherein the predetermined distance is a distance to a service facility.

* * * * *